(12) United States Patent
Kabashima et al.

(10) Patent No.: US 7,042,211 B2
(45) Date of Patent: May 9, 2006

(54) MULTIROTATION TYPE ENCODER

(75) Inventors: Takefumi Kabashima, Fukuoka (JP);
Kazunari Matsuzaki, Fukuoka (JP);
Koji Uemura, Fukuoka (JP); Takashi Nagase, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 11 days.

(21) Appl. No.: 10/492,846

(22) PCT Filed: Oct. 15, 2002

(86) PCT No.: PCT/JP02/10693

§ 371 (c)(1),
(2), (4) Date: Apr. 16, 2004

(87) PCT Pub. No.: WO03/036237

PCT Pub. Date: May 1, 2003

(65) Prior Publication Data

US 2004/0246148 A1 Dec. 9, 2004

(30) Foreign Application Priority Data

Oct. 19, 2001 (JP) .............................. 2001-322393
Mar. 12, 2002 (JP) .............................. 2002-066293
Apr. 1, 2002 (JP) .............................. 2002-098152

(51) Int. Cl.
*G01B 7/30* (2006.01)

(52) U.S. Cl. ................................ 324/207.25

(58) Field of Classification Search ........ 324/173–174, 324/207.13, 207.2, 207.21, 207.25, 244, 324/260–261; 123/612, 617

See application file for complete search history.

(56) References Cited

U.S. PATENT DOCUMENTS

| | | | |
|---|---|---|---|
| 5,544,000 A | | 8/1996 | Suzuki et al. |
| 6,064,198 A | * | 5/2000 | Wolf et al. ............... 324/207.2 |
| 2001/0009367 A1 | * | 7/2001 | Seitzer et al. ........... 324/207.21 |
| 2002/0047433 A1 | * | 4/2002 | Sekiyama et al. ....... 310/156.55 |
| 2002/0130657 A1 | * | 9/2002 | Li .......................... 324/207.21 |

FOREIGN PATENT DOCUMENTS

| | | |
|---|---|---|
| GB | 2102532 A | 2/1983 |
| JP | 58-66055 A | 4/1983 |
| JP | 59-6774 U | 1/1984 |
| JP | 63-115009 A | 5/1988 |
| JP | 2-212769 A | 8/1990 |
| JP | 57-64113 A | 4/1992 |
| JP | 11064043 | 5/1999 |

* cited by examiner

*Primary Examiner*—Bot LeDynh
(74) *Attorney, Agent, or Firm*—Sughrue Mion, PLLC (57) ABSTRACT

A multirotation type encoder of the invention includes a first encoder 20 attached to a rotating shaft 11 of a rotating machine 10 for detecting an absolute value rotational angle within one rotation, and a second encoder for counting a multirotation amount of the rotating shaft 11 by using a speed reducing mechanism 30 by magnetic coupling and the second encoder 40 is constituted by a first magnetic gear 31 directly connected to the rotating shaft and magnetized in multiple poles and at least one second magnetic gear 32 arranged to be opposed thereto in noncontact and magnetized in multiple poles by a number of magnetic poles larger than that of the first magnetic gear 31 and is constituted to count a multirotation amount by detecting a rotational angle of the second magnetic gear by the second encoder.

10 Claims, 7 Drawing Sheets

MULTIROTATION TYPE ENCODER

TECHNICAL FIELD

The present invention relates to a batteryless multirotation type encoder for detecting the amount of multirotation of a servomotor used for a robot, a machine tool or the like by an absolute value angle.

RELATED ART

Figure 12:
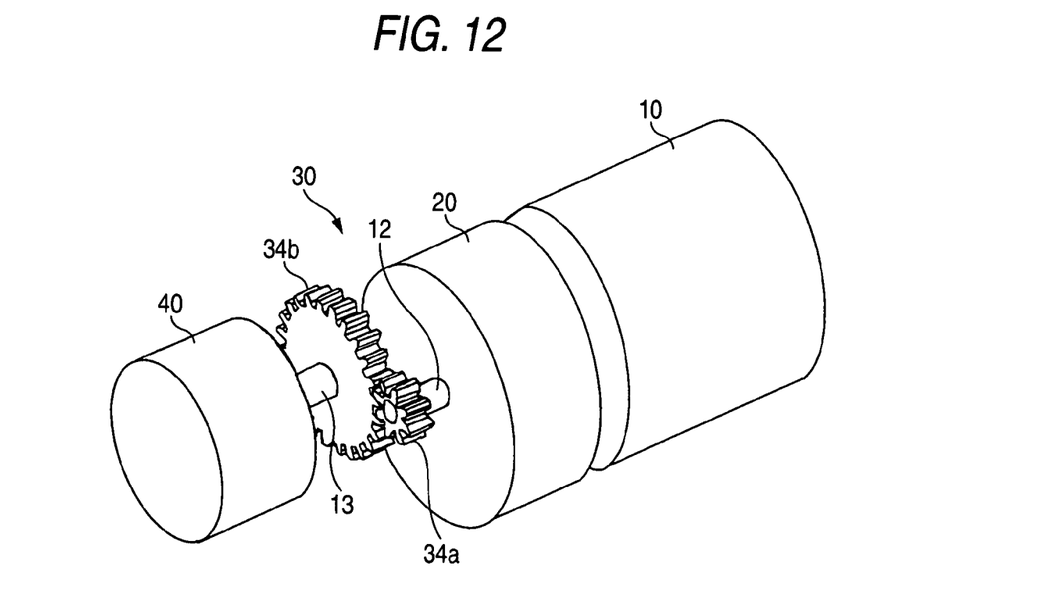
FIG. 12 is a perspective view showing a multirotation type encoder of a related art.

There is a multirotation type encoder of a related art as shown by FIG. 12. FIG. 12 is a perspective view showing the multirotation type encoder of the related art. In the drawing, numeral 10 designates a rotating machine, numeral 20 designates a first encoder and numeral 40 designates a second encoder. A rotating shaft 12 of the first encoder 20 is attached with a driving gear 34a and the gear 34a is coupled to a driven gear 34b. The gear 34b is coupled to the second encoder 40 via a rotating shaft 13.

According to the multirotation type encoder constituted in this way, when the rotating machine 10 is rotated, the second encoder 40 is transmitted with a rotational number reduced in accordance with a reduction ratio determined by a ratio of teeth numbers of the gear 34a and the gear 34b. That is, a rotational angle of the rotating machine 10 is detected by using the first encoder 20 and a multirotation amount thereof is detected by using the second encoder 40.

However, since the related art is provided with a mechanical multirotation transmitting mechanism, in order to increase the reduction ratio, the diameter of the driven gear needs to be significantly increased relative to the diameter of the driving gear and there poses a problem of bringing about large-sized formation of the apparatus, and even when a set of gears having small reduction ratios is constituted in multistage, there poses a problem that the mechanism is complicated and large-sized formation of the apparatus is brought about. Further, in bringing the gears in mesh with each other, there poses a problem that an error is produced at a rotation detector by backlash or wear of meshed faces or a problem that reliability is deteriorated. Furthermore, since the rotational angle is detected by counting teeth numbers of the gears at respective stages and therefore, there poses a problem that an electronic part and a battery are needed for storing a count number and cost and time are needed for interchanging the battery periodically. Further, in order to accurately determine a boundary reaching two rotations from one rotation, an absolute value encoder within one rotation needs to separately provide on the rotating shaft.

DISCLOSURE OF THE INVENTION

Hence, in view of the above-described drawback of the related art, an object of the present invention is to provide a multirotation type encoder which is small-sized even in the case in which the multirotation transmitting portion is at a high reduction ratio, having no mechanical contact portion other than a bearing, having high reliability and long life and dispensing with interchange of a battery.

In order to resolve the above-described problem, the present invention is constructed by the following constitution.

(1) In a multirotation type encoder comprising a first encoder attached to a rotating shaft of a rotating machine for detecting an absolute value rotational angle within one rotation, and a second encoder for counting a multirotation amount of the rotating shaft by using a speed reducing mechanism by magnetic coupling, the second encoder comprises a first magnetic gear directly connected to the rotating shaft and magnetized in multiple poles, at least one second magnetic gear arranged to be opposed to the first magnetic gear in noncontact and magnetized in multiple poles by a number of magnetic poles larger than a number of magnetic poles of the first magnetic gear, and first magnetic field detecting means for detecting a rotational angle of the second magnetic gear.

According to the constitution, by rotating the rotating machine, even when a magnetic pole pitch of the first magnetic gear differs from a magnetic pole pitch of the second magnetic gear, rotation of the first magnetic gear is reduced in speed in accordance with the number of poles of the second magnetic gear via magnetic coupling and is accurately transmitted as rotation of the second magnetic gear. Therefore, a reduction ratio can be increased by increasing the number of poles of the second magnetic gear and therefore, it is not necessary to increase a diameter of the second magnetic gear and even when the reduction ratio is increased, large-sized formation of the apparatus can be prevented. Further, since a mechanical contact portion is not present and rotation can be transmitted in noncontact and therefore, a multirotation type encoder having high reliability and long life and dispensing with a battery can be realized.

(2) The second magnetic gear is arranged to the first magnetic gear via an air gap therebetween in a radial direction thereof.

According to the constitution, an absolute value angle of the second magnetic gear is detected and therefore, high accuracy is constituted and also a battery for holding memory of angle information is dispensed with.

(3) The second magnetic gear is arranged in an axial direction of the first magnetic gear to overlap the first magnetic gear.

According to the constitution, the magnetic gears are arranged to overlap in the axial direction and therefore, small-sized formation in the axial direction can be constituted.

(4) The second encoder comprises a third magnetic gear provided at a second rotating shaft for supporting the second magnetic gear and magnetized in multiple poles, and second magnetic field detecting means arranged by at least two pieces thereof to one piece of the third magnetic gear via an air gap between the third magnetic gear and the second magnetic field detecting means.

According to the constitution, since the third magnetic gear and the second magnetic field detecting means are provided, a small-sized second encoder can be constituted and an angle of the second magnetic gear can be detected with high accuracy.

(5) The second encoder comprises a magnetic yoke in a ring-like shape provided at an inner periphery of the second magnetic gear, a cylindrical magnet provided at an inner periphery of the magnetic yoke and magnetized in two poles, and third magnetic field detecting means arranged at an inner portion of the cylindrical magnet by at least two pieces thereof.

According to the constitution, small-sized formation in the axial direction can be constituted, magnetic circuits of the speed reducing mechanism and the angle detecting mechanism portion can be isolated from each other by using the magnetic yoke and therefore, magnetic interference with each other is not present, smooth speed reduction can be carried out and accuracy of detecting the rotational angle is also promoted.

(6) The first encoder comprises the first magnetic gear and fourth magnetic field detecting means arranged to the first magnetic gear via an air gap therebetween at least by two pieces thereof.

According to the constitution, the first magnetic gear serves to function as the speed reducing mechanism and function as a constituent element of the magnetic type encoder for generating a magnetic field and therefore, small-sized formation can be constituted.

(7) The first magnetic gear is formed in a cylindrical shape and magnetized to generate a magnetic field in one direction uniformly in a direction orthogonal to a center axis thereof.

According to the constitution, the magnetic type encoder is constituted by providing the fourth magnetic field detecting means at the inner portion of the first magnetic gear and therefore, further small-sized formation can be constituted.

(8) A magnetic damper comprising a magnetic body is arranged at an outer peripheral portion of the second magnetic gear via an air gap therebetween.

According to the constitution, outside rotational vibration can be absorbed and therefore, a highly reliable multirotation type encoder against external vibration can be provided.

(9) The magnetic damper is arranged on an extended line connecting the center of the first magnetic gear and the center of the second magnetic gear.

According to the constitution, the magnetic damper is arranged at a position at which the magnetic damper is operated in a direction opposed to the magnetic attractive force generated between the first magnetic gear and the second magnetic gear, thereby, sizes of bearings derived from the magnetic attracting force generated between the first magnetic gear and the second magnetic gear can be reduced, small-sized formation can be constituted and long life formation can be achieved.

(10) The magnetic damper is arranged at an inner peripheral portion of a frame substantially in a cylindrical shape for supporting the rotating shaft and shafts of the magnetic gears by a structure integrated therewith.

According to the constitution, the respective magnetic gears are magnetically shielded and therefore, a multirotation type encoder strong at an external magnetic field can be provided.

BEST MODE FOR CARRYING OUT THE INVENTION

An explanation will be given of embodiments of the invention in reference to the drawings as follows.

FIRST EMBODIMENT

Figure 1:
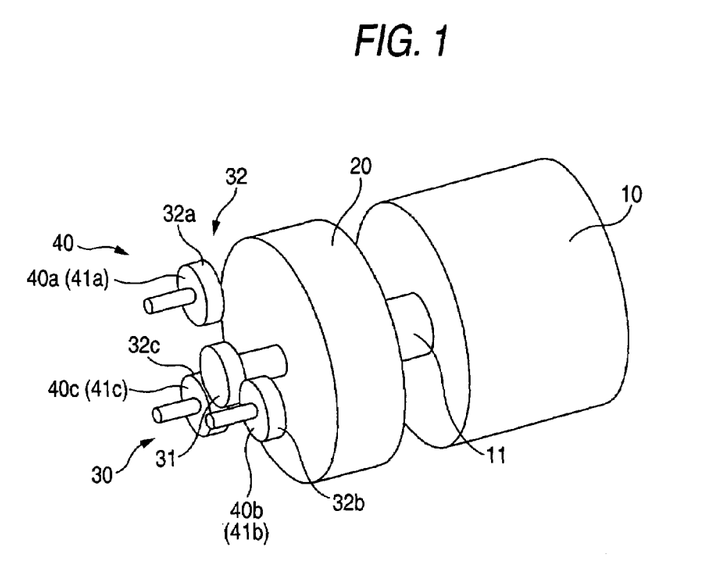
FIG. 1 is a perspective view of a multirotation type encoder showing the first embodiment of the invention.
Figure 2:
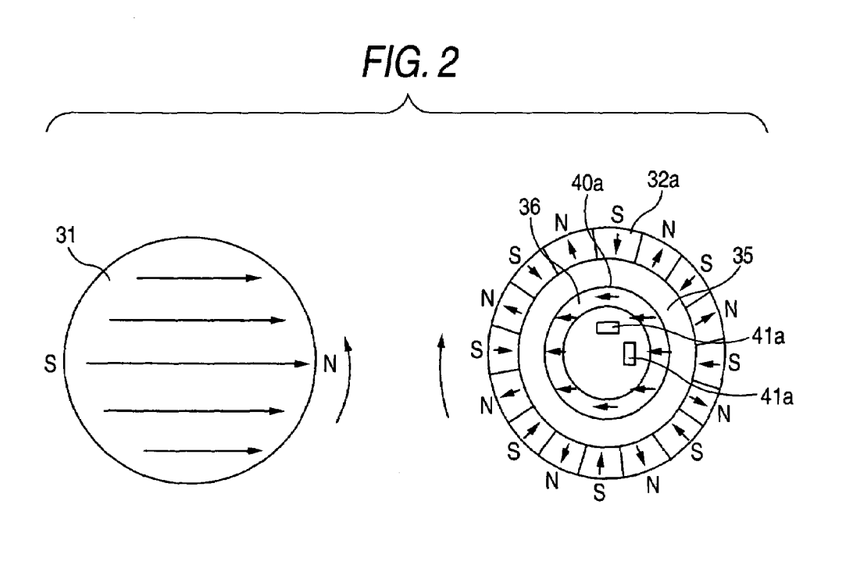
FIG. 2 is a schematic view showing the direction of magnetizing a magnetic gear in FIG. 1.

FIG. 1 shows a first embodiment of the invention. FIG. 1 is a perspective view of a multirotation type encoder showing the first embodiment of the invention. In the drawing, numeral 20 designates a first encoder for detecting an absolute value angle, numeral 30 designates a speed reducing mechanism comprising a first magnetic gear 31 and a second magnetic gear 32, numeral 40 designates a second encoder, and numeral 41 designates first magnetic field detecting means. FIG. 2 illustrates schematic views of the magnetic gears of the speed reducing mechanism 30. FIG. 2($a$) shows the first magnetic gear 31 of FIG. 1 and FIG. 2($b$) shows the second magnetic gear 32 thereof. An arrow mark in the drawings indicates a magnetizing direction. Meanwhile, the second magnetic gear 32 is magnetized in a circumferential direction at a number of portions thereof.

The first magnetic gear 31 having a diameter of 5 mm is magnetized in 2 poles in a direction orthogonal to a rotating shaft. The diameter of the second magnetic gear 32 is set to 5 mm, the number of poles thereof is set to 16 poles and the clearance between the magnetic gears is set to 0.3 mm. Further, the second magnetic gear 32 is arranged at the surrounding of the first magnetic gear 31 via an air gap therebetween in a radial direction. Therefore, when portions of the first magnetic gear 31 and the second magnetic gear 32 having different polarities are facing to each other, an attracting force is operated therebetween and by constituting a transmitting force thereby, rotation of the first magnetic gear 31 is transmitted to the second magnetic gear 32.

The second encoder 40 comprises the second magnetic gear 32 and the first magnetic field detecting means 41 and detects the amount of multirotation amount of a rotating shaft 11 by detecting the rotational angle of the second magnetic gear 32.

Next, operation of the encoder having the constitution will be described. When the first magnetic gear 31 is rotated, rotation of the first magnetic gear 31 is reduced in speed and transmitted to the second magnetic gear 32. A reduction ratio at this occasion is prescribed by a ratio of magnetic pole numbers of the first magnetic gear 31 and the second magnetic gear 32. Here, ratios of magnetic pole numbers of second magnetic gears 32$a$, 32$b$, and 32$c$ relative to that of the first magnetic gear 31 are respectively designated by notations L, M, N. When by using second encoders 40$a$, 40$b$, and 40c, a rotational angle of the second magnetic gear 32a by a unit of 1/L circumference, a rotational angle of the second magnetic gear 32b by a unit of 1/M circumference, and a rotational angle of the second magnetic gear 32c by a unit of 1/N circumference are detected, three kinds of signals from gears 32a, 32b and 32c can be provided from respective detectors. Therefore, a least common multiple of L, M, N constitutes a number of combination thereof and a multirotation amount in correspondence with the least common multiple can be counted. For example, when L, M, N are set as L=21, M=22, N=23, a multirotation amount of 10626 times can be detected.

Further, although according to the embodiment, a number of pieces of the second magnetic gears 32 is set to 3 pieces, the multirotation amount can be detected when the number of pieces is equal to or larger than 1 piece.

In such the constitution, actually, the first magnetic gear 31 and the second magnetic gear 32a are rotatably supported by bearings, not illustrated, the first magnetic gear 31 is rotated from outside and it is measured whether the second magnetic gear 32 is reduced in speed. The first magnetic gear is rotated at 6000 rpm and behaviors of rotations of the first magnetic gear 31 and the second magnetic gear 32 are compared.

Figure 3:
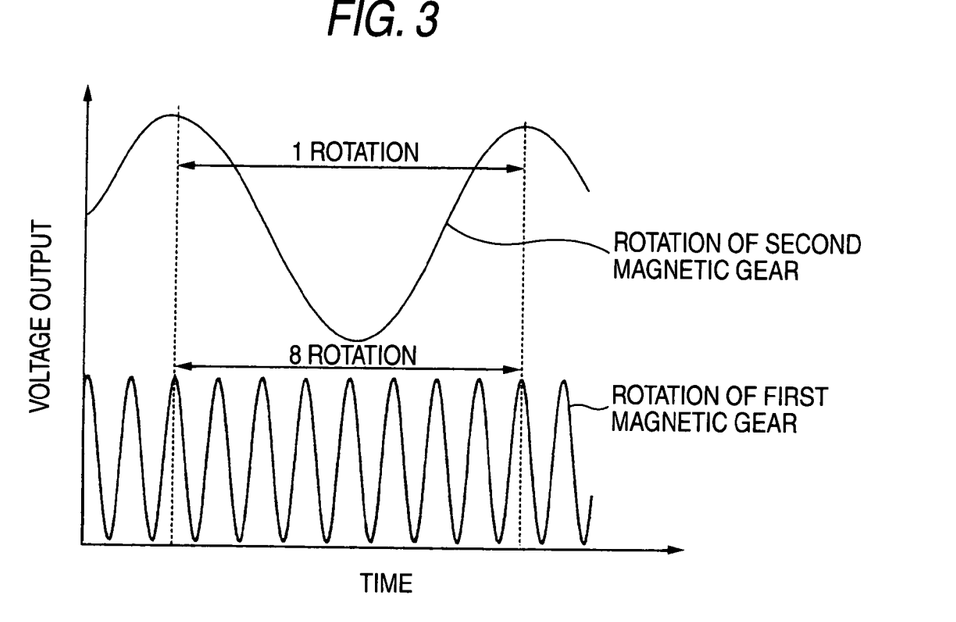
FIG. 3 is a waveform diagram showing a result of measurement of the multirotation type encoder according to the first embodiment.

FIG. 3 shows a result of measurement. FIG. 3 illustrates waveforms for comparing rotational numbers of the first magnetic gear 31 and the second magnetic gear 32 during a constant period of time. It is confirmed that whereas the first magnetic gear 31 is rotated by 8 rotations, the second magnetic gear 32 is rotated by 1 rotation under a condition of a reduction ratio of 1:8. That is, it is known that although a magnetic pole pitch of the first magnetic gear 31 is 7.85 mm and a magnetic pole pitch of the second magnetic gear 32 is 0.98 mm and both thereof differ from each other by a multiplication factor of about 8, speed is accurately reduced and transmitted.

SECOND EMBODIMENT

Figure 4:
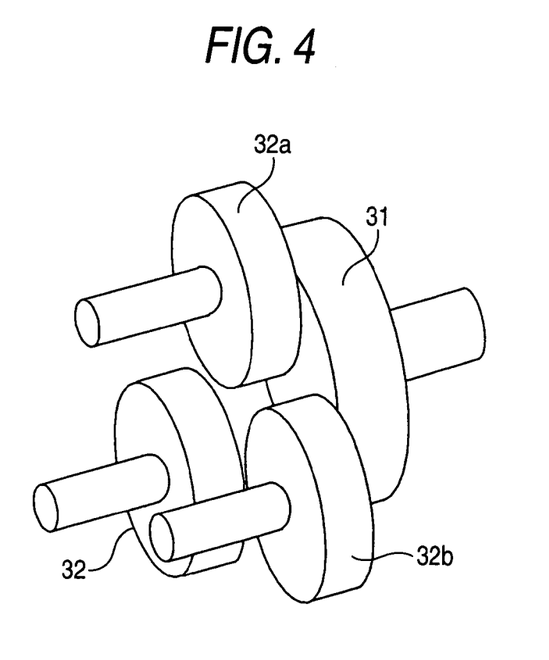
FIG. 4 is a perspective view of a magnetic gear showing a second embodiment of the invention.

FIG. 4 shows a second embodiment of the invention. FIG. 4 is a perspective view of a magnetic coupling portion comprising magnetic gears showing a second embodiment of the invention.

A second magnetic gear 32 is arranged relative to a first magnetic gear 31 to overlap each other in an axial direction via an air gap. The first magnetic gear 31 is magnetized in a longitudinal direction of a rotating shaft and a number of poles thereof is 2 poles. Also the second magnetic gear 32 is magnetized in a longitudinal direction of a rotating shaft and multiple poles are magnetized in a circumferential direction. Therefore, when portions of the first magnetic gear 31 and the second magnetic gear 32 having different polarities are opposed to each other, an attracting force is operated therebetween, a transmitting force is constituted thereby, and rotation of the first magnetic gear 31 is transmitted to the second magnetic gear 32. Although operation and effect thereof are similar to those of the first embodiment, small-sized formation can be constituted with regard to a diameter direction since the first and the second magnetic gears overlap each other.

THIRD EMBODIMENT

Figure 5:
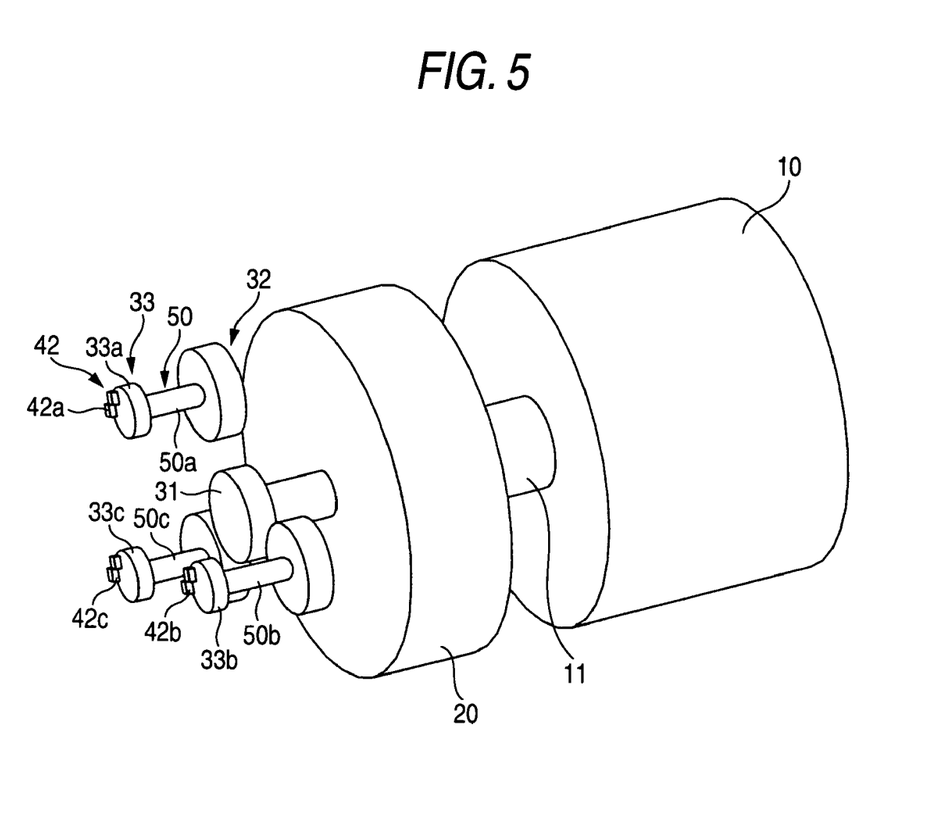
FIG. 5 is a perspective view of a multirotation type encoder showing a third embodiment of the invention.

FIG. 5 shows a third embodiment of the invention. FIG. 5 is a perspective view of a multirotation type encoder showing the third embodiment of the invention. In the drawing, notations 33, 33a, 33b, 33c designate third magnetic gears, notations 42, 42a, 42b, 42c designate second magnetic field detecting means, and notations 50, 50a, 50b, 50c designate second rotating shafts for connecting the second magnetic gear 32 and the third magnetic gear 33. All of the magnetic gears are rotatably supported by bearings, not illustrated, via the second rotating shaft 50. The third magnetic gear 33 is magnetized orthogonally to the rotating shaft 50 and in one direction. Further, 2 pieces or more of the second magnetic field detecting means 42 are arranged at a surrounding of the third magnetic gear 33.

Next, an explanation will be given of a method of detecting a rotational angle of the second magnetic gear 32. When the third magnetic gear 33 is rotated simultaneously with the second magnetic gear 32, a sine wave of 1 period per 1 rotation can be provided from the second magnetic field detecting means 42 arranged at the surrounding of the third magnetic gear 33. Outputs having shapes of a sine wave and a cosine wave can be provided from 2 pieces of the second magnetic field detecting means 42 as voltage values. When respective output voltages at a certain time point are designated by notations Va, Vb, a rotational angle θ of the second magnetic gear 32 can be calculated by the following equation.

$$\theta = \arctan(Va/Vb)$$

Operation and effect thereof are similar to those of the first embodiment. Further, by using a magnetic type encoder, the embodiment achieves an effect of dispensing with a battery or the like for backup which has been needed in an optical type encoder or the like for holding an absolute value and reducing a number of parts and content of maintenance.

FOURTH EMBODIMENT

Figure 6:
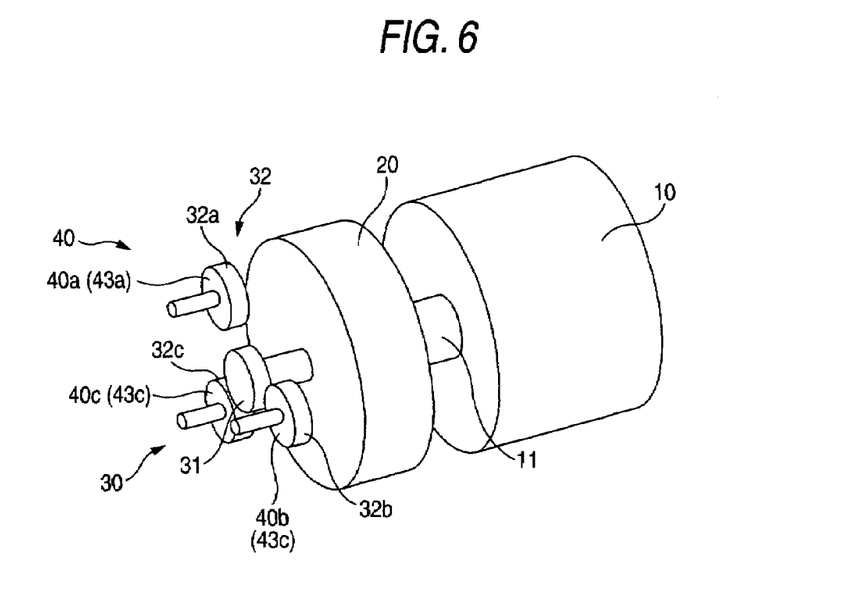
FIG. 6 is a perspective view of a multirotation type encoder showing a fourth embodiment of the invention.
Figure 7:
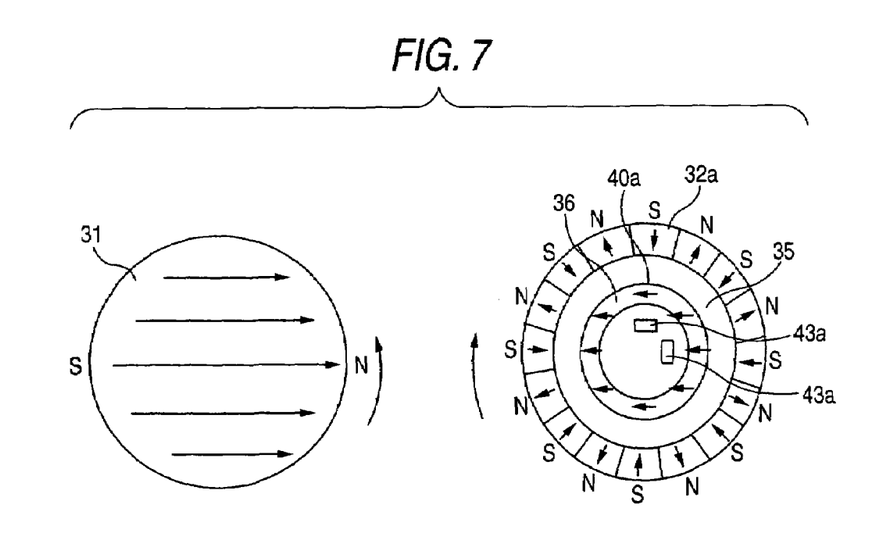
FIG. 7 is a schematic view showing a constitution of a second magnetic gear according to the fourth embodiment of the invention.

FIG. 6 shows a fourth embodiment of the invention and FIG. 7 shows details of the second magnetic gear 32. In the drawings, numeral 35 designates a magnetic yoke, numeral 36 designates a cylindrical magnet and numeral 43 designates third magnetic field detecting means.

Although the embodiment is substantially the same as the third embodiment, a point of the embodiment which differs therefrom resides in that the second encoder 40 is constituted by the magnetic yoke 35 provided at an inner periphery of the second magnetic gear 32, the cylindrical magnet 36 arranged at an inner portion thereof and the third magnetic field detecting means 43 arranged at an inner portion thereof. The speed reducing mechanism portion is constituted by the first magnetic gear 31 magnetized in 2 poles and the second magnetic gear 32 similar, to the third embodiment. Further, a rotational angle detecting mechanism portion of the second magnetic gear is constituted by the magnetic yoke 35, the cylindrical magnet 36 provided on an inner side thereof and magnetized in 2 poles in a direction orthogonal to a rotating shaft and the second magnetic field detecting means 42 arranged at a space portion on an inner side thereof. The magnetic yoke 35 isolates a magnetic circuit of the magnetic speed reducing mechanism constituted by multiple pole magnetizing magnets of the second magnetic gear 32 and the magnetic circuit of the cylindrical magnet 36 thereby prevent magnetic interference from being brought about between the two magnetic circuits.

Although operation and effect of the embodiment are similar to those of the third embodiment, a thin type speed reducing mechanism simultaneously having a speed reducing function and a rotational angle detecting function can be constituted, small-sized formation in an axial direction can be constituted and an ultra small-sized multirotation type encoder can be realized. Further, since the magnetic interference is not present, smooth speed reduction of the magnetic gear can be carried out and accuracy of detecting the rotational angle can further be promoted.

FIFTH EMBODIMENT

Figure 8:
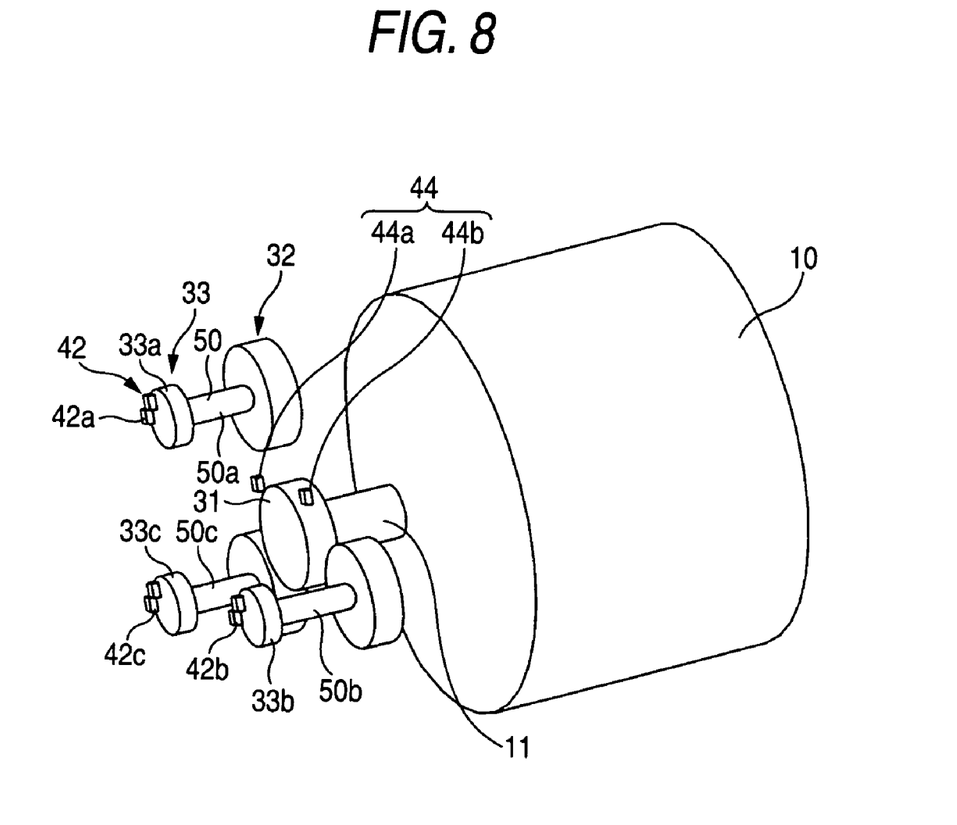
FIG. 8 is a perspective view of a multirotation type encoder showing a fifth embodiment of the invention.

FIG. 8 shows a fifth embodiment of the invention. In the drawing, notations 44, 44a, 44b designate fourth magnetic field detecting means. Although the embodiment is substantially the same as the first embodiment, a point of the embodiment which differs therefrom resides in that the first encoder 20 is constituted by arranging the first magnetic gear 31 and the fourth magnetic field detecting means 44a, 44b at the surrounding of the first magnetic gear 31 via an air gap therebetween. Since a sine wave and a cosine wave can be detected from the fourth magnetic field detecting means 44, the rotational angle of the first magnetic gear can be known by calculating inverse tangent similar to the third embodiment. Although operation and effect of the embodiment is similar to those of the first embodiment, further small-sized formation can be constituted with regard to the axial direction.

SIXTH EMBODIMENT

Figure 9:
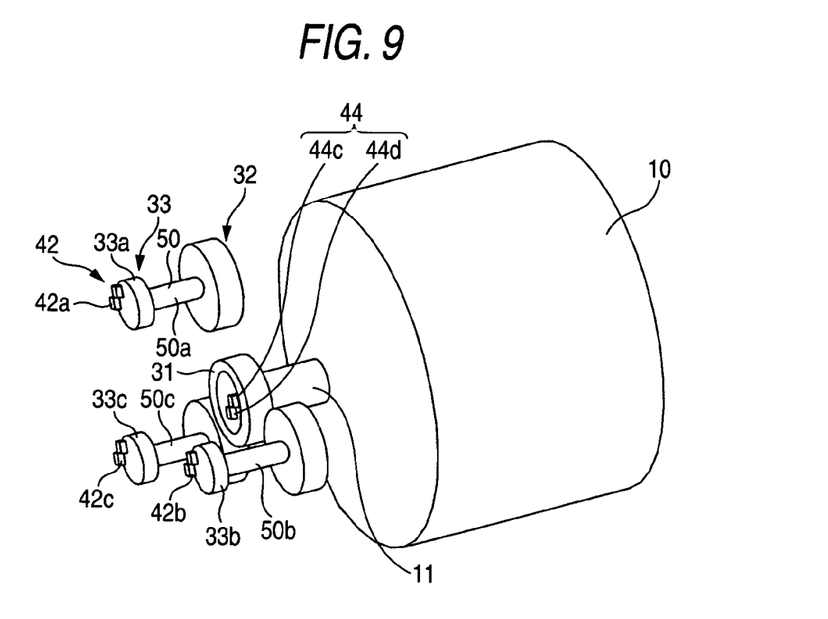
FIG. 9 is a perspective view of a multirotation type encoder showing a sixth embodiment of the invention.

FIG. 9 shows a sixth embodiment of the invention. The embodiment is substantially the same as the fifth embodiment. A point of the embodiment which differs therefrom resides in that the first magnetic gear 31 is formed in a cylindrical shape, a uniform magnetic field in one direction is generated in a direction orthogonal to a center axis thereof and fourth magnetic field detecting means 44, 44c, 44d are arranged at inside of an air gap of the first magnetic gear 31 by a predetermined phase difference therebetween. A sine wave and a cosine wave can be detected from the fourth magnetic field detecting means 44 and therefore, the rotational angle of the first magnetic gear can be known by calculating inverse tangent similar to the third embodiment. Operation and effect thereof are similar to those of the fifth embodiment.

SEVENTH EMBODIMENT

Figure 10:
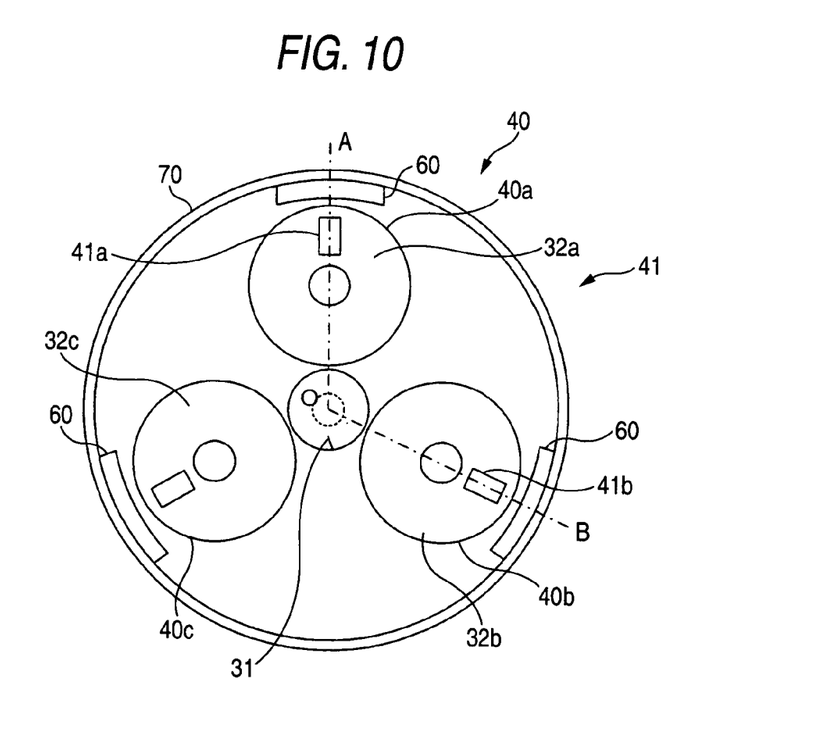
FIG. 10 is a plane view of a magnetic gear portion of a multirotation type encoder showing a seventh embodiment of the invention.

FIG. 10 shows a magnetic gear portion which is a seventh embodiment of the invention. In the drawing, numeral 60 designates a magnetic damper and numeral 70 designates a frame.

According to the embodiment, the magnetic damper 60 constituted by a magnetic body is arranged at an outer peripheral portion of the second magnetic gear 32 via an air gap therebetween and the magnetic damper is arranged on an extended line connecting a center of the first magnetic gear 31 and a center of the second magnetic gear 32.

When the second magnetic gear 32 is rotated, an eddy current is generated at the magnetic damper 60 constituted by the magnetic body and vibration energy is converted into thermal energy in the magnetic body. That is, the second magnetic gear 32 is operated not to rotate by being applied with viscous braking. Therefore, a magnetic attractive force between the second magnetic gear 32 and the magnetic damper 60 is directed in a direction opposed to the magnetic attractive force between the first magnetic gear 31 and the second magnetic gear 32, as a result, a radial load supplied to bearings (not illustrated) of the first magnetic gear 31 and the second magnetic gear is reduced.

By providing the magnetic damper 60, rotational vibration applied from outside to the second magnetic gear 32 by way of the rotating shaft 11 is absorbed and therefore, the vibration is not transmitted thereto. That is, a highly reliable multirotation type encoder against external vibration can be provided.

Further, although the first magnetic gear 31 and the second magnetic gear 32 are opposed to each other via a small clearance (0.1 mm or smaller), the radial load is applied to the bearings holding the respective magnetic gears by the magnetic attractive force between the first magnetic gear 31 and the second magnetic gear 32, since the magnetic damper 60 is provided, it is not necessary to enlarge the bearings by an amount in correspondence with an amount of the radial load and the radial load is alleviated. Therefore, with the present constitution, small side of the encoder can be ensured and long life formation of the bearings can be achieved.

EIGHTH EMBODIMENT

Figure 11:
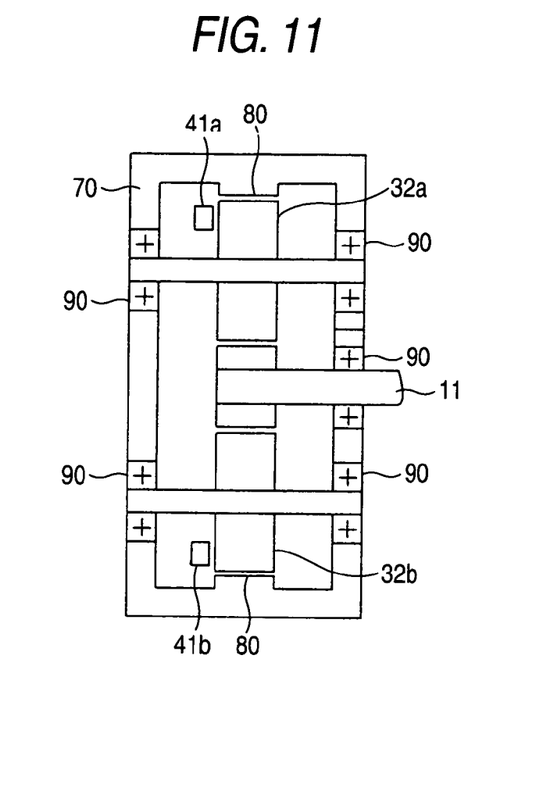
FIG. 11 is a sectional view of a magnetic gear portion of a multirotation type encoder showing an eighth embodiment of the invention.

FIG. 11 shows a magnetic gear portion which is an eighth embodiment of the invention. FIG. 11 shows a sectional view at a position the same as that of an A-O-B section in FIG. 10 of the seventh embodiment. In the drawing, numeral 80 designates a frame serving also as damper 80 and numeral 90 designates a bearing.

According to the embodiment, the frame serving also as damper 80 is constituted by integrating the frame 70 and the magnetic damper 60 of the seventh embodiment.

By providing the frame serving also as magnetic damper 80, the number of used parts can be reduced, further, magnetic shielding can be constituted thereby and therefore, influence of external magnetism can also be prevented.

INDUSTRIAL APPLICABILITY

According to the invention, a first magnetic gear connected directly to a rotating shaft and magnetized in multiple poles and at least one piece of second magnetic gear arranged opposedly to the first magnetic gear in noncontact and magnetized with multiple poles by a number lager than that of the first magnetic gear, a multirotation amount is counted by detecting the rotational angle of the second magnetic gear and therefore, an effect of providing a multirotation type encoder is achieved which is small-sized even in the case in which a multirotation transmitting portion is constituted by a high reduction ratio, having no mechanical contact portion other than a bearing, having high reliability and long life and dispensing with interchange of a battery.

Further, a reliable multirotation type encoder can be provided against external vibration by arranging a magnetic damper and small-sized formation and long life formation thereof can be achieved.

The invention claimed is:

1. A multirotation type encoder comprising:
   a first encoder attached to a rotating shaft of a rotating machine for detecting an absolute rotational angle within one rotation; and
   a second encoder for counting a multirotation amount of the rotating shaft by using a speed reducing mechanism by magnetic coupling,
   wherein the second encoder comprises:
   a first magnetic gear directly connected to the rotating shaft and magnetized in multiple poles;
   at least one second magnetic gear arranged opposedly to the first magnetic gear in noncontact and having magnetic poles by a number larger than a number of magnetic poles of the first magnetic gear; and first magnetic field detecting means for detecting a rotational angle of the second magnetic gear.

2. The multirotation type encoder according to claim 1, wherein the second magnetic gear is arranged to the first magnetic gear via an air gap therebetween in a radial direction thereof.

3. The multirotation type encoder according to claim 1, wherein the second magnetic gear is arranged in an axial direction of the first magnetic gear to overlap the first magnetic gear.

4. The multirotation type encoder according to claim 1, wherein the second encoder further comprises:

a third magnetic gear, provided at a second rotating shaft supporting the second magnetic gear, and magnetized in multiple poles; and second magnetic field detecting means arranged with at least two pieces thereof to one piece of the third magnetic gear via an air gap between the third magnetic gear and the second magnetic field detecting means.

5. The multirotation type encoder according to claim 1, wherein the second encoder further comprises:

a magnetic yoke in a ring-like shape provided at an inner periphery of the second magnetic gear;

a cylindrical magnet provided at an inner periphery of the magnetic yoke and magnetized in two poles; and third magnetic field detecting means arranged at an inner portion of the cylindrical magnet by at least two pieces thereof.

6. The multirotation type encoder according to claim 1, wherein the first encoder comprises:

the first magnetic gear; and fourth magnetic field detecting means arranged by at least two pieces thereof via an air gap between the first magnetic gear and the fourth magnetic field detecting means.

7. The multirotation type encoder according to claim 1, wherein the first magnetic gear is formed in a cylindrical shape and magnetized to generate a magnetic field in one direction uniformly in a direction orthogonal to a center axis thereof.

8. The multirotation type encoder according to claim 1, wherein a magnetic damper comprising a magnetic body is arranged at an outer peripheral portion of the second magnetic gear via an air gap therebetween.

9. The multirotation type encoder according to claim 8, wherein the magnetic damper is arranged on an extended line connecting a center of the first magnetic gear and a center of the second magnetic gear.

10. The multirotation type encoder according to claim 8, wherein the magnetic damper is arranged at an inner peripheral portion of a frame substantially in a cylindrical shape for supporting the rotation shaft and a shaft of the magnetic gear by a structure integrated therewith.

* * * * *